United States Patent
Ichikawa et al.

(10) Patent No.: US 8,772,978 B2
(45) Date of Patent: Jul. 8, 2014

(54) POWER TRANSMITTING APPARATUS, POWER RECEIVING APPARATUS, AND WIRELESS POWER TRANSMISSION SYSTEM

(75) Inventors: Keiichi Ichikawa, Kyoto-fu (JP); Shinji Goma, Kyoto-fu (JP); Kazuya Kato, Kyoto-fu (JP); Miyako Kabumoto, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 540 days.

(21) Appl. No.: 13/165,542

(22) Filed: Jun. 21, 2011

(65) Prior Publication Data

US 2011/0316353 A1    Dec. 29, 2011

(30) Foreign Application Priority Data

Jun. 24, 2010  (JP) ................................. 2010-144210
Oct. 29, 2010  (JP) ................................. 2010-243345

(51) Int. Cl.
*H01F 27/42* (2006.01)

(52) U.S. Cl.
USPC .......................................... 307/104; 455/41.1

(58) Field of Classification Search
CPC ............................. H02J 7/025; H04B 5/0012
USPC .......................................... 307/104; 455/41.1
See application file for complete search history.

(56) References Cited

U.S. PATENT DOCUMENTS

| | | | |
|---|---|---|---|
| 5,600,225 A | 2/1997 | Goto | |
| 6,040,680 A | 3/2000 | Toya et al. | |
| 6,275,681 B1 * | 8/2001 | Vega et al. | 455/41.1 |
| 6,282,407 B1 * | 8/2001 | Vega et al. | 455/41.1 |
| 6,879,809 B1 * | 4/2005 | Vega et al. | 455/41.1 |
| 8,212,433 B2 * | 7/2012 | Kashiwagi et al. | 307/400 |
| 8,242,638 B2 * | 8/2012 | Camurati et al. | 307/104 |

(Continued)

FOREIGN PATENT DOCUMENTS

| | | |
|---|---|---|
| CN | 101257217 A | 9/2008 |
| EP | 1793307 A1 | 6/2007 |

(Continued)

OTHER PUBLICATIONS

The Second Office Action issued by the State Intellectual Property Office of People's Republic of China on Sep. 10, 2013, which corresponds to Chinese Patent Application No. 201110168988.9 and is related to U.S. Appl. No. 13/165,542; with translation.

(Continued)

*Primary Examiner* — Daniel Cavallari
(74) *Attorney, Agent, or Firm* — Studebaker & Brackett PC

(57) ABSTRACT

A power transmitting apparatus includes a power transmitting apparatus side passive electrode and a power transmitting apparatus side active electrode, and a power receiving apparatus includes a power receiving apparatus side active electrode and a power receiving apparatus side active electrode. The power transmitting apparatus side active electrode and the power transmitting apparatus side passive electrode are not parallel with each other in terms of a positional relationship, and the power receiving apparatus side active electrode and the power receiving apparatus side passive electrode are not parallel with each other in terms of a positional relationship. By mounting the power receiving apparatus on the power transmitting apparatus, the power transmitting apparatus side passive electrode and active electrode respectively face the power receiving apparatus side passive electrode and active electrode.

14 Claims, 16 Drawing Sheets

(56) References Cited

U.S. PATENT DOCUMENTS

| | | | |
|---|---|---|---|
| 8,277,927 B2* | 10/2012 | Kashiwagi et al. | 428/216 |
| 8,476,789 B2* | 7/2013 | Ichikawa et al. | 307/104 |
| 8,536,739 B2* | 9/2013 | Ichikawa et al. | 307/104 |
| 8,587,156 B2* | 11/2013 | Camurati et al. | 307/104 |
| 8,587,157 B2* | 11/2013 | Camurati et al. | 307/104 |
| 2007/0062852 A1 | 3/2007 | Zachut et al. | |
| 2007/0126393 A1 | 6/2007 | Bersenev | |
| 2009/0134837 A1 | 5/2009 | Bersenev | |
| 2009/0206675 A1 | 8/2009 | Camurati et al. | |
| 2009/0302690 A1 | 12/2009 | Kubono et al. | |
| 2010/0233958 A1* | 9/2010 | Washiro | 455/41.1 |
| 2011/0025261 A1 | 2/2011 | Bersenev | |
| 2011/0199050 A1 | 8/2011 | Bersenev | |
| 2011/0234019 A1* | 9/2011 | Camurati et al. | 307/149 |
| 2012/0119703 A1 | 5/2012 | Bersenev | |
| 2012/0146431 A1* | 6/2012 | Ichikawa et al. | 307/149 |
| 2012/0146574 A1* | 6/2012 | Ichikawa et al. | 320/107 |
| 2012/0181980 A1* | 7/2012 | Ichikawa et al. | 320/108 |
| 2014/0028114 A1* | 1/2014 | Ichikawa et al. | 307/109 |

FOREIGN PATENT DOCUMENTS

| | | | |
|---|---|---|---|
| FR | 2875649 A1 | 3/2006 | |
| FR | 2920061 A1 | 2/2009 | |
| JP | 2671809 B2 | 11/1997 | |
| JP | 11-040207 A | 2/1999 | |
| JP | 3140996 U | 3/2008 | |
| JP | 2009-089520 A | 4/2009 | |
| JP | 2009-531009 T | 8/2009 | |
| JP | 2009-296857 A | 12/2009 | |
| WO | 2007107642 A1 | 9/2007 | |

OTHER PUBLICATIONS

The first Office Action issued by the Intellectual Property Office of People's Republic of China on Jun. 4, 2013, which corresponds to Chinese Patent Application No. 201110168988.9 and is related to U.S. Appl. No. 13/165,542, with translation.

The third Office Action issued by the State Intellectual Property Office of People's Republic of China on Mar. 5, 2014, which corresponds to Chinese Patent Application No. 201110168988.9 and is related to U.S. Appl. No. 13/165,542; with English language translation.

The extended European search report issued on Apr. 4, 2014, which corresponds to European Patent Application No. 11170980.4-1804 and is related to U.S. Appl. No. 13/165,542.

* cited by examiner

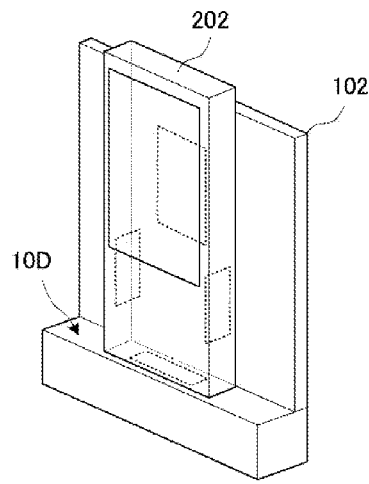
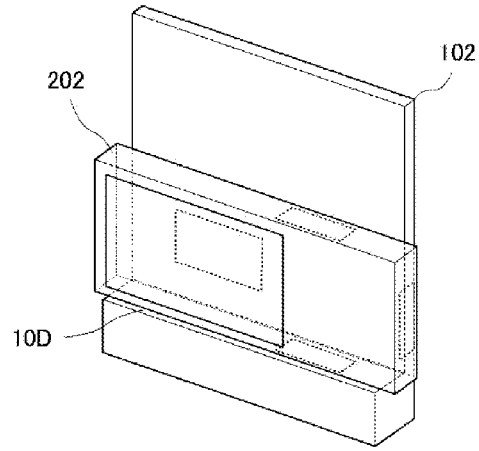
FIG.8A  FIG.8B
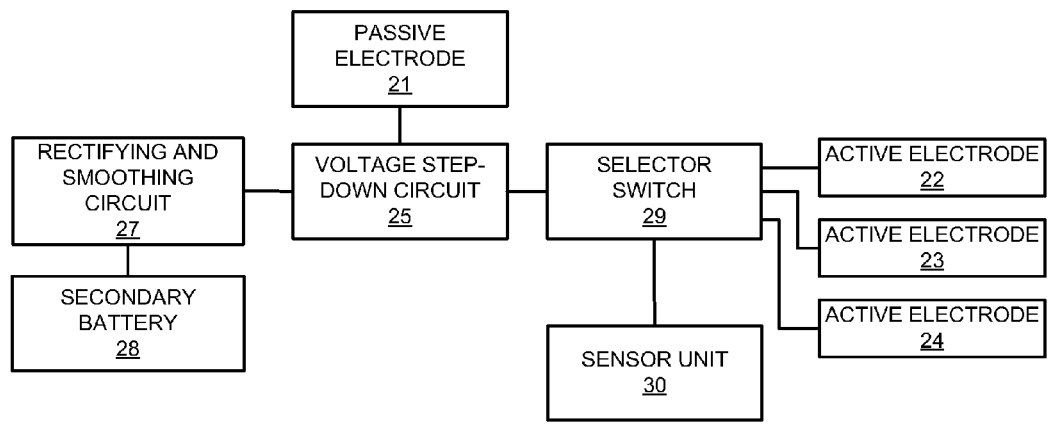
FIG.9

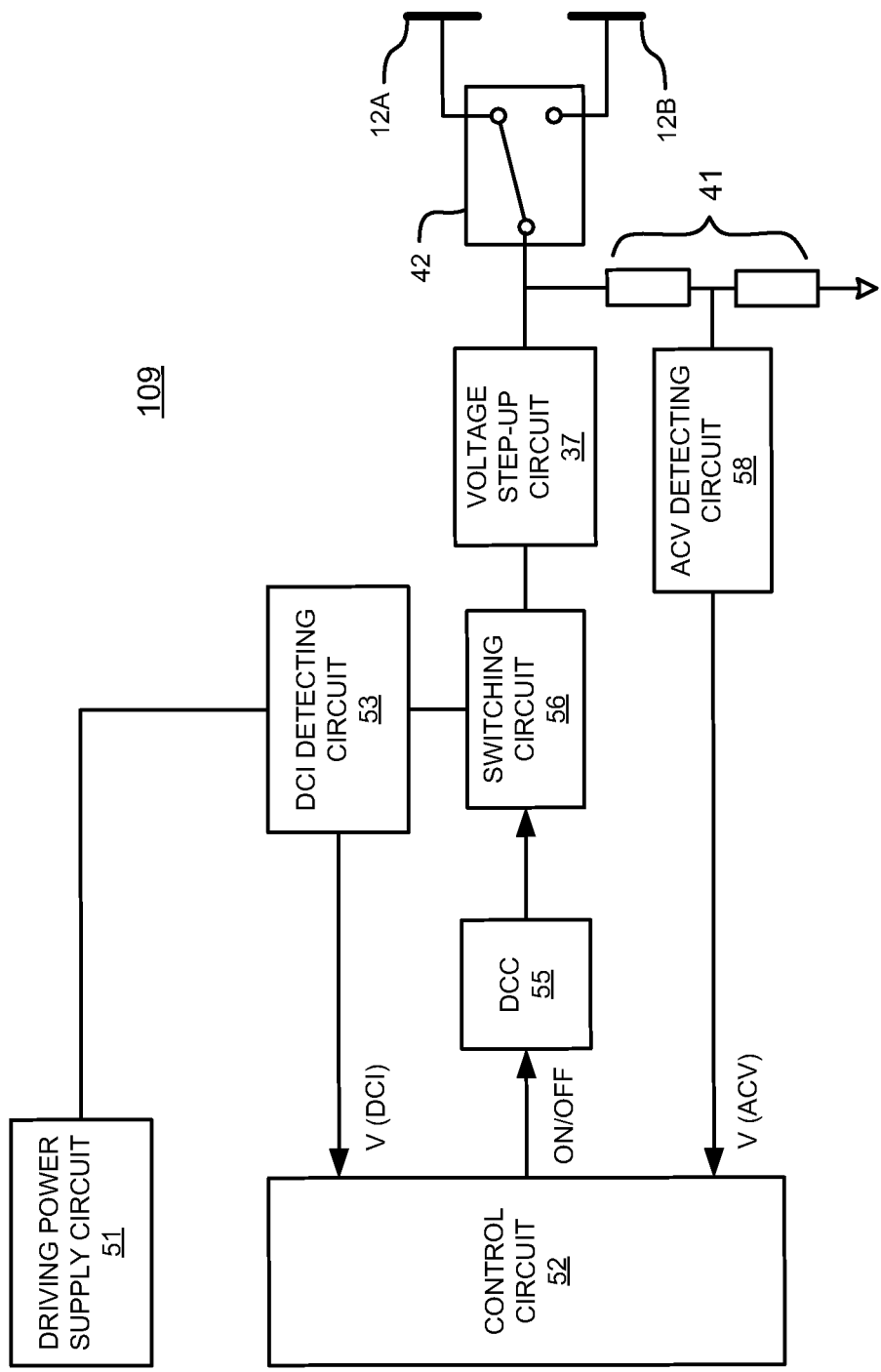

POWER TRANSMITTING APPARATUS, POWER RECEIVING APPARATUS, AND WIRELESS POWER TRANSMISSION SYSTEM

CROSS REFERENCE TO RELATED APPLICATIONS

The present application claims priority to Japanese Patent Application No. 2010-144210 filed Jun. 24, 2010, and Japanese Patent Application No. 2010-243345 filed Oct. 29, 2010, the entire contents of each of these applications being incorporated herein by reference in their entirety.

FIELD OF THE INVENTION

The present invention relates to power transmitting apparatuses, power receiving apparatuses, and power transmission systems for wireless electric power transmission.

BACKGROUND

Examples of typical known wireless power transmission systems include magnetic-field-coupling power transmission systems in which power is transmitted from the primary coil of a power transmitting apparatus to the secondary coil of a power receiving apparatus using a magnetic field. high accuracy is required in the relative positional relationship between the primary coil and the secondary coil when transmitting power using magnetic-field-coupling because electromotive force is strongly influenced by the magnitude of magnetic flux passing through each coil. In addition, use of coils makes it is difficult to reduce the sizes of the power transmitting and power receiving apparatuses.

On the other hand, electric-field-coupling wireless power transmission systems are known, as disclosed in Japanese Unexamined Patent Application Publication (Translation of PCT Application) No. 2009-531009 and Japanese Unexamined Patent Application Publication No. 2009-296857. In these systems, power is transmitted from the coupling electrode of a power transmitting apparatus to the coupling electrode of a power receiving apparatus through an electric field. This method allows the accuracy of the relative positional relationship between the coupling electrodes to be relatively low and allows the sizes and thicknesses of the coupling electrodes to be reduced.

FIG. 1 illustrates the basic configuration of the power transmission system disclosed in Japanese Unexamined Patent Application Publication (Translation of PCT Application) No. 2009-531009. This power transmission system includes a power transmitting apparatus and a power receiving apparatus. The power transmitting apparatus includes a high-frequency voltage generator circuit 1, a passive electrode 2, and an active electrode 3. The power receiving apparatus includes a high-frequency voltage load circuit 5, a passive electrode 7, and an active electrode 6. As a result of the active electrode 3 and the active electrode 6 being arranged to be close to each other with a gap 4 therebetween, these two electrodes are coupled to each other through an electric field.

The passive electrode of the power transmitting apparatus, the active electrode of the power transmitting apparatus, the active electrode of the power receiving apparatus, and the passive electrode of the power receiving apparatus have a common normal line passing through the centers thereof.

In the power transmission system disclosed in Japanese Unexamined Patent Application Publication No. 2009-296857, a power transmitting apparatus includes a first resonant circuit that resonates with an AC signal generated by an AC signal generator and a power feeding electrode. A power receiving apparatus includes a power receiving electrode that generates an electric signal, a second resonant circuit that resonates with the electric signal, a rectifier that generates a DC power from the electric signal with which the second resonant circuit is resonating, and a circuit load. The active electrode and passive electrode of the power transmitting apparatus are arranged in the same plane, and the active electrode and passive electrode of the power receiving apparatus are arranged so as to face the corresponding electrodes of the power transmitting apparatus with a predetermined separation therebetween.

SUMMARY

This disclosure provides a power transmitting apparatus, a power receiving apparatus, and a wireless power transmission system in which stray capacitance not contributing to power transmission can be decreased and the power transmission efficiency can be increased without causing increases in the sizes of the apparatuses.

In a disclosed embodiment, a power receiving apparatus forms a pair with a power transmitting apparatus in which a high-frequency voltage generator circuit that applies a high-frequency high voltage is connected between a power transmitting apparatus side active electrode and a power transmitting apparatus side passive electrode. The power receiving apparatus includes a power receiving apparatus side active electrode that faces the power transmitting apparatus side active electrode with the power receiving apparatus mounted to the power transmitting apparatus, a power receiving apparatus side passive electrode that faces the power transmitting apparatus side passive electrode with the power receiving apparatus mounted to the power transmitting apparatus, a voltage step-down circuit that decreases a voltage generated between the power receiving apparatus side active electrode and the power receiving apparatus side passive electrode, and a load circuit that receives an output voltage of the voltage step-down circuit as a power supply voltage. The power receiving apparatus side active electrode and the power receiving apparatus side passive electrode are not parallel with each other in terms of a positional relationship.

In a more specific embodiment, the power receiving apparatus further may include a casing that is a solid figure having six surfaces.

In another more specific embodiment, the power receiving apparatus side active electrode and the power receiving apparatus side passive electrode may be, for example, perpendicular to each other.

In another more specific embodiment, the power receiving apparatus side passive electrode may be provided along, for example, a first surface which has a relatively large area among six surfaces of the casing of the power receiving apparatus, and a second surface which is one of four surfaces (side surfaces) neighboring the first surface among the six surfaces of the casing of the power receiving apparatus may be provided with the power receiving apparatus side active electrode.

In yet another more specific embodiment, the power receiving apparatus side passive electrode or active electrode may be provided, for example, along a first surface among six surfaces of a casing of the power receiving apparatus, and each of a plurality of surfaces among second to fifth surfaces neighboring the first surface among the six surfaces is provided with the power receiving apparatus side active electrode or passive electrode.

In still another more specific embodiment, the power receiving apparatus may further include a detecting unit that detects an electrode facing the power transmitting apparatus side active electrode among electrodes arranged along second to fifth surfaces neighboring the first surface among six surfaces of a casing of the power receiving apparatus; and a switching unit that connects the electrode facing the power transmitting apparatus side active electrode to the voltage step-down circuit.

In another more specific embodiment, the power receiving apparatus may be formed of a power receiving apparatus main body and a jacket that surrounds the power receiving apparatus main body. The casing may be the jacket, and the jacket may include at least the power receiving apparatus side active electrode, the power receiving apparatus side passive electrode, the voltage step-down circuit, and a jacket side electrode that supplies an output voltage of the voltage step-down circuit. The power receiving apparatus main body may include a power receiving apparatus main body side electrode that is in contact with and electrically connected to the jacket side electrode, and the load circuit electrically connected to the power receiving apparatus main body side electrode.

In another disclosed embodiment, a power transmitting apparatus forms a pair with a power receiving apparatus in which a voltage step-down circuit is connected between a power receiving apparatus side active electrode and a power receiving apparatus side passive electrode. The power transmitting apparatus includes a power transmitting apparatus side active electrode that faces the power receiving apparatus side active electrode with the power receiving apparatus mounted to the power transmitting apparatus, a power transmitting apparatus side passive electrode that faces the power receiving apparatus side passive electrode with the power receiving apparatus mounted to the power transmitting apparatus, and a high-frequency voltage generator circuit connected between the power transmitting apparatus side active electrode and the power transmitting apparatus side passive electrode. The power transmitting apparatus side active electrode and the power transmitting apparatus side passive electrode are not parallel with each other in terms of a positional relationship.

In a more specific embodiment, the power transmitting apparatus may include a first flat portion provided with the power transmitting apparatus side active electrode, and a second flat portion that is provided with the power transmitting apparatus side passive electrode and that is perpendicular to the first flat portion. For example, the first flat portion may be a seat provided with an active electrode, and the second flat portion may be a backrest provided with a passive electrode. Alternatively, for example, the first flat portion may be a mounting portion provided with a passive electrode, and the second flat portion may be a sidewall provided with an active electrode.

In another more specific embodiment, the power transmitting apparatus may include a third flat portion perpendicular to the first flat portion and the second flat portion, and the power transmitting apparatus side active electrode may face the power receiving apparatus side active electrode in a state in which one surface of a casing of the power receiving apparatus is in contact with the third flat portion.

In yet another more specific embodiment, the third flat portion may be provided with the power transmitting apparatus side passive electrode.

In another more specific embodiment, the third flat portion may be provided with a third flat portion side power transmitting apparatus side active electrode separated from the power transmitting apparatus side electrode provided in the first flat portion, and the power transmitting apparatus may further include a detecting unit that detects which of the power transmitting apparatus side active electrode in the first flat portion and the power transmitting apparatus side active electrode in the third flat portion is an electrode facing the active electrode of the power receiving apparatus, and a switching unit that connects the electrode facing the active electrode of the power receiving apparatus to the high-frequency voltage generator circuit.

In another disclosed embodiment, a wireless power transmission system includes a power transmitting apparatus in which a high-frequency voltage generator circuit that applies a high-frequency high voltage is connected between a power transmitting apparatus side active electrode and a power transmitting apparatus side passive electrode, and a power receiving apparatus in which a voltage step-down circuit is connected between a power receiving apparatus side active electrode and a power receiving apparatus side passive electrode and which includes a load circuit that receives an output voltage of the voltage step-down circuit as a power supply voltage. The power transmitting apparatus side active electrode is not parallel with the power transmitting apparatus side passive electrode, and the power receiving apparatus side active electrode is not parallel with the power receiving apparatus side passive electrode.

In a more specific embodiment, the power transmitting apparatus may include a first flat portion provided with the power transmitting apparatus side active electrode, a second flat portion that is provided with the power transmitting apparatus side passive electrode and that is perpendicular to the first flat portion and a third flat portion perpendicular to the first flat portion and the second flat portion. The power transmitting apparatus side active electrode faces the power receiving apparatus side active electrode in a state in which one surface of a casing of the power receiving apparatus is in contact with the third flat portion. A point at which a line that is perpendicular to the first flat portion or the second flat portion and that passes through a center of gravity of the power receiving apparatus intersects with the first flat portion or the second flat portion is farther from the third flat portion than a center of the first flat portion or the second flat portion.

Other features, elements, characteristics and advantages will become more apparent from the following detailed description of preferred embodiments with reference to the attached drawings.

BRIEF DESCRIPTION OF THE DRAWINGS

FIGS. 8A and 8B are perspective views illustrating exemplary types of usage of the wireless power transmission system according to the second exemplary embodiment.

FIG. 9 is a circuit block diagram of a power receiving apparatus which is part of a wireless power transmission system according to a third exemplary embodiment.

FIG. 19 is a block diagram of the power transmitting apparatus according to the ninth exemplary embodiment.

DETAILED DESCRIPTION

In the power transmission system disclosed in Japanese Unexamined Patent Application Publication (Translation of PCT Application) No. 2009-531009, the active electrodes of the power transmitting apparatus and the power receiving apparatus are made to be close to each other, thereby forming a strong electric field between the electrodes, and the capacitance generated between the passive electrodes of the power transmitting apparatus and the power receiving apparatus is made to be as high as possible. Hence the sizes of the passive electrodes need to be increased. The inventors realized that when the passive electrode of the power transmitting unit, the active electrode of the power transmitting unit, the active electrode of the power receiving unit, and the passive electrode of the power receiving unit are arranged in a vertical direction in a narrow vertically-long space, stray capacitance is likely to become excessively high.

The inventors also realized that in the power transmission system disclosed in Japanese Unexamined Patent Application Publication No. 2009-296857, stray capacitance generated between the active or passive electrode and a circuit substrate arranged close to the electrode is likely to become excessively high because the active electrode and passive electrode are arranged adjacent to each other in a plane. Hence, it was identified that coupling is not strong and transmission efficiency is low in both of these cases.

The power receiving apparatuses are, for example, electronic apparatuses such as a mobile communication terminal and a digital camera. Recent requirements to reduce the sizes and an increase in the packaging density of these apparatuses have increased restrictions on the arrangement of the active electrode and the passive electrode. Stray capacitance generated between the active electrode and the passive electrode becomes large, depending on the arrangement relationship between the two electrodes, and as a result, the degree of coupling between the power transmitting apparatus and the power receiving apparatus may decrease, whereby the power transmission efficiency decreases. Further, depending on the arrangement relationship between the active electrode and the conductors of a printed wiring board, a secondary battery, and the like housed in the electronic apparatus, stray capacitance generated between the active electrode and the conductors is large. This not only lowers the power transmission efficiency, but also affects the electric characteristics of various circuits formed on the printed wiring board and the battery characteristics of the secondary battery.

Exemplary embodiments that can address these and other shortcomings will now be described with reference to the drawings.

Figure 1:
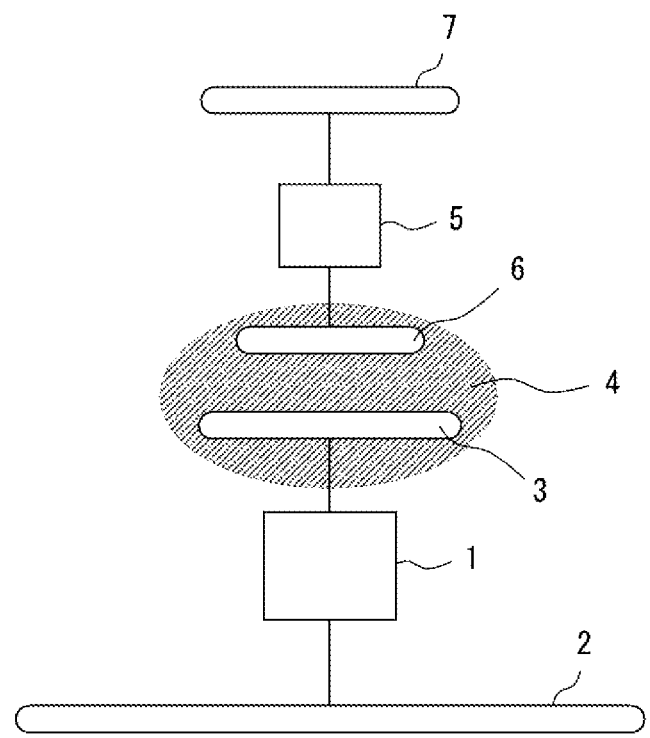
FIG. 1 is a diagram of the basic configuration of the power transmission system disclosed in Japanese Unexamined Patent Application Publication (Translation of PCT Application) No. 2009-531009.
Figure 2:
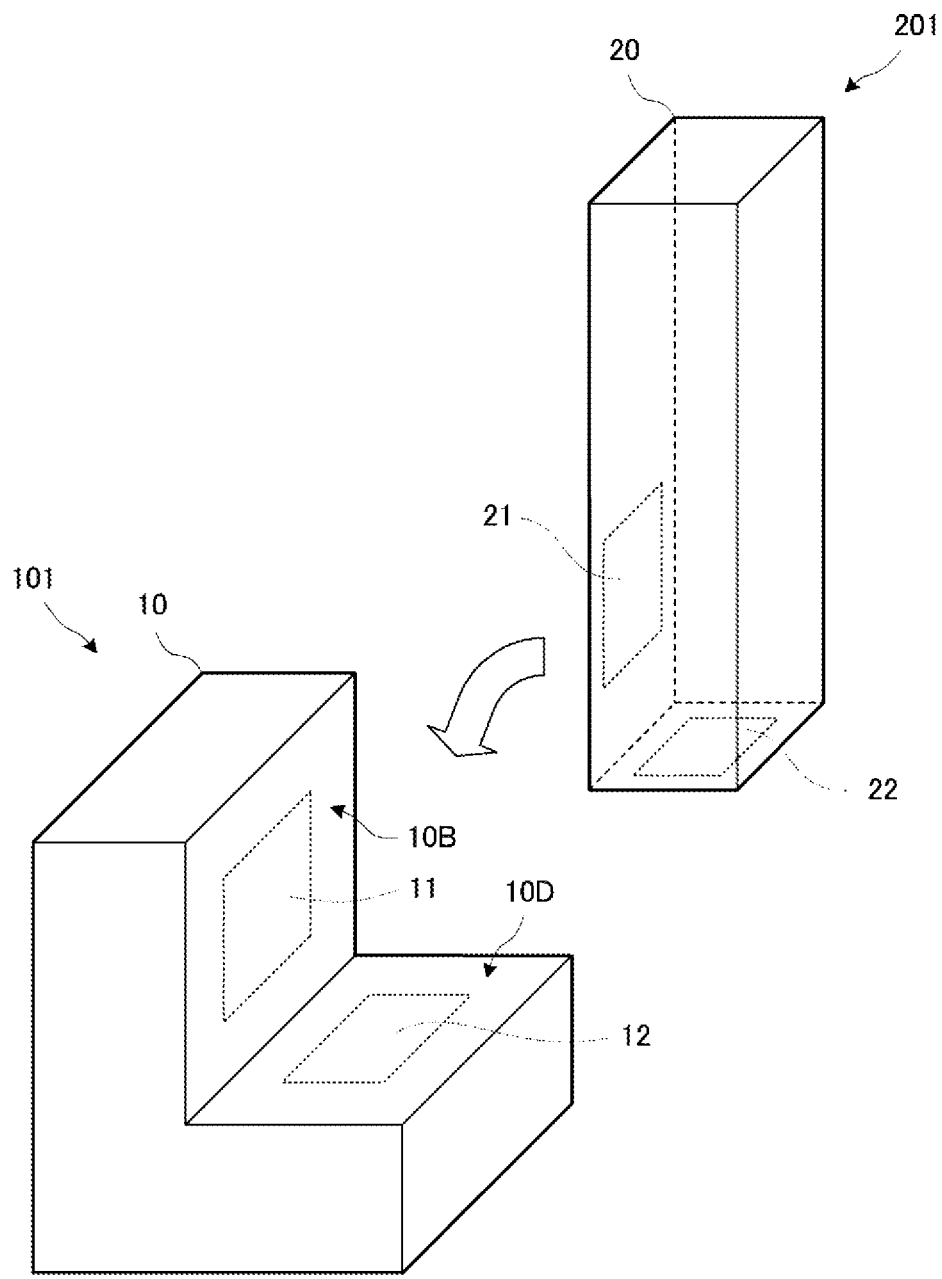
FIG. 2 shows perspective views of an example of a power transmitting apparatus and a power receiving apparatus according to a first exemplary embodiment.
Figure 3:
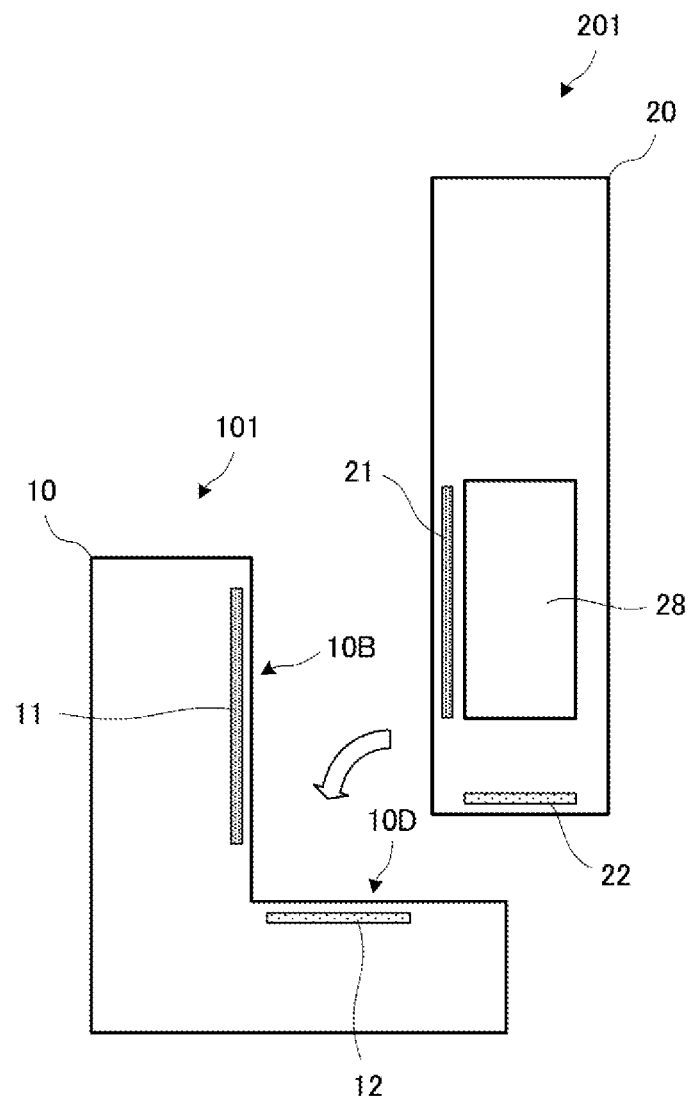
FIG. 3 shows side views of the power transmitting apparatus and the exemplary power receiving apparatus shown in FIG. 2.

FIG. 2 illustrates perspective views of a power transmitting apparatus 101 and a power receiving apparatus 201 according to a first exemplary embodiment. FIG. 3 illustrates side views of the power transmitting apparatus 101 and the power receiving apparatus 201. The power transmitting apparatus 101 and the power receiving apparatus 201 form a wireless power transmission system.

The power transmitting apparatus 101 includes a passive electrode 11 and an active electrode 12, and the power receiving apparatus 201 includes a passive electrode 21 and an active electrode 22. A casing 20 of the power receiving apparatus 201 is substantially shaped like a rectangular parallelepiped, and the passive electrode 21 of the power receiving apparatus 201 is provided along a first surface, which has a large area, and the active electrode 22 of the power receiving apparatus 201 is provided along a second surface, which is one of the four surfaces (side surfaces) neighboring the first surface among the six surfaces of the casing.

A casing 10 of the power transmitting apparatus 101 includes a seat 10D and a backrest 10B. The seat 10D and backrest 10B form a mounting portion of the power receiving apparatus 201. By mounting the power receiving apparatus 201 on the mounting portion of the power transmitting apparatus 101, the passive electrode 11 of the power transmitting apparatus 101 faces the power receiving apparatus side passive electrode 21 and the active electrode 12 of the power transmitting apparatus 101 faces the power receiving apparatus side active electrode 22. The seat 10D corresponds to a "first flat portion" of the present embodiment, and the backrest 10B corresponds to a "second flat portion" of the present disclosure.

A high-frequency voltage generator circuit is connected between the power transmitting apparatus side active electrode 12 and the power transmitting apparatus side passive electrode 11. A voltage step-down circuit is provided between the power receiving apparatus side active electrode 22 and the power receiving apparatus side passive electrode 21, and a load circuit is connected to the voltage step-down circuit. In this example, the load circuit is a secondary battery 28. The power receiving apparatus 201 can be, for example, a mobile electronic apparatus, and the power transmitting apparatus 101 can be its charging stand. By mounting the power receiving apparatus 201 on the power transmitting apparatus 101, the internal secondary battery 28 is charged. Mobile electronic apparatuses include a mobile phone, a laptop PC, a digital camera, etc.

Figure 4:
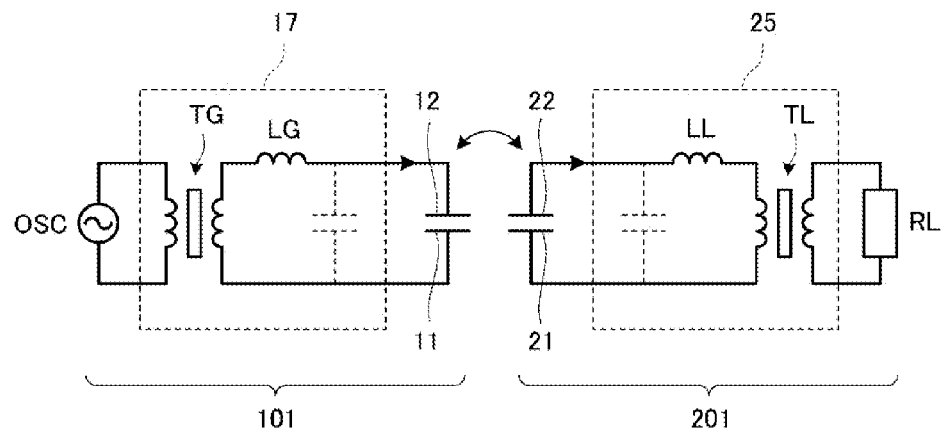
FIG. 4 is an equivalent circuit diagram of a wireless power transmission system.

FIG. 4 is an equivalent circuit diagram of the wireless power transmission system. Referring to FIG. 4, a high-frequency voltage generator circuit OSC of the power transmitting apparatus 101 generates, for example, a high-frequency voltage with a frequency of about 100 kHz to tens of MHz. A voltage step-up circuit 17 formed of a step-up transformer TG and an inductor LG steps up a voltage generated by the high-frequency voltage generator circuit OSC and applies the stepped-up voltage between the passive electrode 11 and the active electrode 12. A voltage step-down circuit 25 formed of a step-down transformer TL and an inductor LL is connected between the passive electrode 21 and the active electrode 22 of the power receiving apparatus 201. A load circuit RL is connected to the secondary side of the step-down transformer TL. The load circuit RL is formed of a rectifying and smoothing circuit and a secondary battery.

According to the first exemplary embodiment, the main surfaces of the active electrode and passive electrode of a power transmitting apparatus are not parallel with each other, and the main surfaces of the active electrode and passive electrode of a power receiving apparatus are not parallel with each other. Hence, stray capacitance between the active electrodes and stray capacitance between the passive electrodes are suppressed, and decreases in the degrees of coupling between the active electrodes and coupling between the passive electrodes are small, whereby high transmission efficiency is obtained. In addition, since the active electrode 22 can be arranged in such a manner as not to be parallel with the printed wire board within the apparatus, influence on the electric characteristics of various circuits within the apparatus and the battery characteristics of a secondary battery is suppressed. Further, the respective active electrodes and the respective passive electrodes of the power transmitting apparatus and the power receiving apparatus can be made to face each other, only by making the power receiving apparatus lean against the backrest and be mounted on the seat of the power transmitting apparatus.

It should be noted that the power receiving apparatus side active electrode and passive electrode, or the power transmitting apparatus side active electrode and passive electrode need not be substantially perpendicular to each other, and need only be at least substantially not parallel with each other. For instance, planes generally defined by main surfaces of each of the receiving apparatus side active electrode and passive electrode, or planes generally defined by each of the main surfaces power transmitting apparatus side active electrode and passive electrode are not parallel with each other in their relative positional relationships.

The frequency of an AC voltage generated by the high-frequency voltage generator circuit OSC is set such that the wavelength in a dielectric medium (i.e., air) surrounding the power transmitting apparatus 101 and the power receiving apparatus 201 is longer than the sizes of the power transmitting apparatus 101 and the power receiving apparatus 201. In other words, power is transmitted using a quasi-static electric field. As a result, since energy radiation (dispersion) in the form of electromagnetic radiation is low, power transmission efficiency is increased. In addition, the frequency of an AC voltage generated by the high-frequency voltage generator circuit OSC is set to be as high as possible within a range in which the radiated electromagnetic energy is smaller than the electric field energy transmitted from the power transmitting apparatus 101 to the power receiving apparatus 201. Due to this, transmitted power can be increased even though the respective areas of the active electrode 12, the passive electrode 11, the active electrode 22, and the passive electrode 21 are small. For a given transmitted power level, the voltage of the coupling electrodes can be lowered. Hence, despite being small in size, a power transmission system having high power transmission efficiency can be realized. The same can be said in the second and subsequent embodiments.

Figures 5A, 5B:
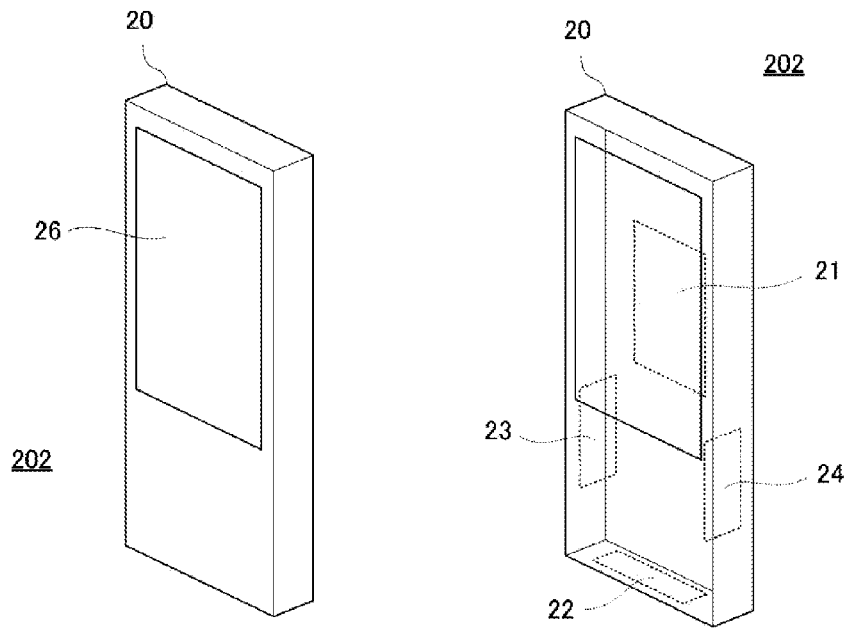
FIG. 5A is a perspective view of a power receiving apparatus that forms part of a wireless power transmission system according to a second exemplary embodiment.
FIG. 5B illustrates an exemplary arrangement of various electrodes provided in the casing of the power receiving apparatus.

FIG. 5A is a perspective view of a power receiving apparatus 202 that forms part of a wireless power transmission system according to a second exemplary embodiment, and FIG. 5B illustrates the arrangement of various electrodes provided in the casing 20 of the power receiving apparatus 202.

The casing 20 of the power receiving apparatus 202 is substantially shaped like a rectangular parallelepiped, and the passive electrode 21 of the power receiving apparatus 202 is provided along a first surface of the casing having a large area, and power receiving apparatus side active electrodes 22, 23, and 24 are provided along three of the four surfaces (side surfaces) neighboring the first surface among the six surfaces of the casing. In addition, a liquid crystal display panel 26 is provided in parallel with the first surface. Further, a circuit substrate (not shown) is provided within the casing 20 in parallel with the first surface.

Figure 6:
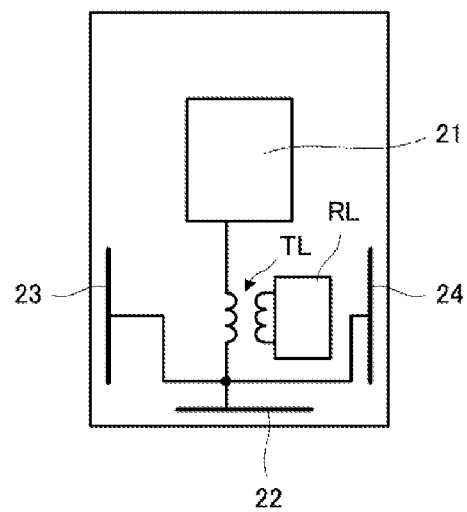
FIG. 6 is a schematic circuit diagram of the power receiving apparatus according to the second exemplary embodiment.

FIG. 6 is a schematic circuit diagram of the power receiving apparatus 202. The primary side of the step-down transformer TL is connected between the passive electrode 21 and the three active electrodes 22, 23, and 24. The load circuit RL is connected to the secondary side of the step-down transformer TL. The three active electrodes 22, 23, and 24, which are commonly connected, have the same potential.

Figure 7:
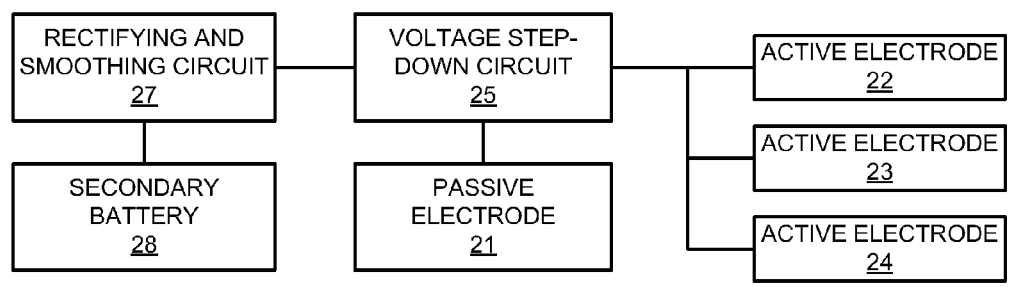
FIG. 7 is a circuit block diagram of the power receiving apparatus according to the second exemplary embodiment.

FIG. 7 is a circuit block diagram of the power receiving apparatus 202. Here, a voltage step-down circuit 25 corresponds to the step-down transformer TL illustrated in FIG. 6. A rectifying and smoothing circuit 27 rectifies and smoothes the output voltage of the voltage step-down circuit 25 and applies a charging voltage to the secondary battery 28. The rectifying and smoothing circuit 27 and the secondary battery 28 correspond to the load circuit RL.

FIGS. 8A and 8B are perspective views of the wireless power transmission system according to the second exemplary embodiment, illustrating types of usage. FIG. 8A illustrates an example in which the power receiving apparatus 202 is mounted in a vertical orientation on the seat 10D of the power transmitting apparatus 102. FIG. 8B illustrates an example in which the power receiving apparatus 202 is mounted in a horizontal orientation on the seat 10D of the power transmitting apparatus 102. The basic configuration of a power transmitting apparatus 102 is the same as that of the power transmitting apparatus 101 shown in the first exemplary embodiment.

Thus, since it is only required that the power receiving apparatus side active electrode face the power transmitting apparatus side active electrode provided along the seat of the power transmitting apparatus 101, the power receiving apparatus 202 can be mounted in three ways.

Note that the power receiving apparatus side active electrodes can be provided along all the surfaces of the four surfaces (side surfaces) neighboring the first surface among the six surfaces of the casing. Further, the power receiving apparatus side active electrodes provided along all the four surfaces can be circularly connected to one another.

Although a single passive electrode and a plurality of active electrodes are provided in the examples illustrated in FIGS. 5A to 8B, the relationship between the passive electrode and the active electrode can be reversed. In other words, a single active electrode can be provided along the first surface of the casing and respective passive electrodes may be provided along any one or any combination of the plurality of surfaces neighboring the first surface.

FIG. 9 is a circuit block diagram of a power receiving apparatus which is part of a wireless power transmission system according to a third exemplary embodiment. The difference from the power receiving apparatus 202 shown in the second exemplary embodiment is that the three active electrodes 22, 23, and 24 are formed to be selectively connected to the voltage step-down circuit 25 using a selector switch 29. The selector switch 29 selects one of the active electrodes 22, 23, and 24 in accordance with the detection result of a sensor unit 30. Using the sensor unit 30, which includes a sensor that detects the direction of gravity acceleration, the active electrode of the power receiving apparatus 202 facing the active electrode of a power transmitting apparatus is detected. The selector switch 29 selects the power receiving apparatus side active electrode facing the active electrode of the power transmitting apparatus. Thereby, safety can be increased because a high potential is not applied to the active electrodes which have not been selected and are in a floating state.

Note that the active electrodes which have not been selected may be connected to the passive electrode. This allows the total area of the passive electrodes to be increased.

The sensor unit 30 also can include a human body sensor. When the human body sensor detects a human body, i.e., a human body is in proximity of the power receiving apparatus, the selector switch 29 makes all the active electrodes 22, 23, and 24 be in a non-selected state. Thereby, charging is terminated. Since the power transmitting apparatus terminates application of a voltage between the active electrode and passive electrode of the power transmitting apparatus by detecting that power transmitted to the power receiving apparatus has become zero, a high potential is not applied between the active electrode and passive electrode of both the power transmitting apparatus and the power receiving apparatus. As a result, safety can be increased.

Note that the selectable power receiving apparatus side active electrodes may be provided along all four surfaces (side surfaces), or any number less than all the surfaces neighboring the first surface among the six surfaces of the casing.

Figure 10A:
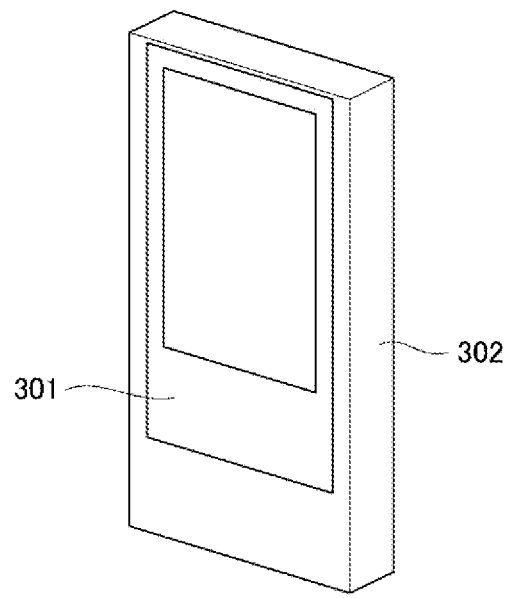
FIG. 10A is a perspective view of a power receiving apparatus which is part of a wireless power transmission system according to a fourth exemplary embodiment.
Figure 10B:
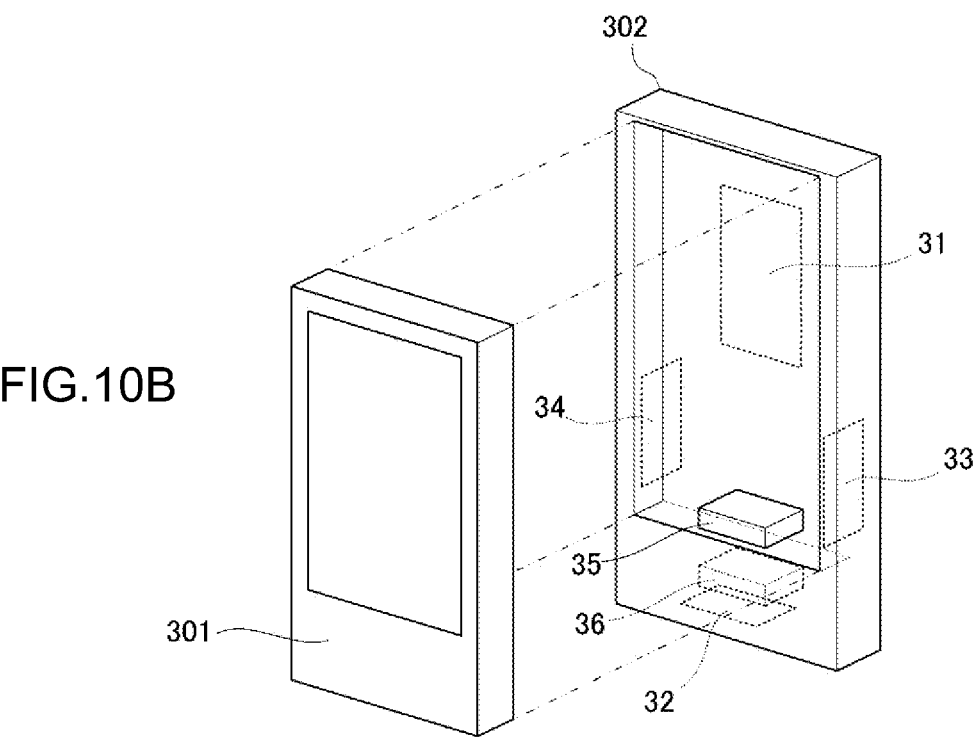
FIG. 10B is a perspective view of a state in which a power receiving apparatus main body is separated from a jacket.

FIG. 10A is a perspective view of a power receiving apparatus, which is part of a wireless power transmission system according to a fourth exemplary embodiment. FIG. 10B is a perspective view of a state in which a power receiving apparatus main body 301 is separated from a jacket 302. This power receiving apparatus is formed of the power receiving apparatus main body 301 and the jacket 302 housing the power receiving apparatus main body 301.

The jacket 302 includes power receiving apparatus side active electrodes 32, 33, and 34, a power receiving apparatus side passive electrode 31, a control circuit 36, and a connector 35 for supplying an output voltage of a voltage step-down circuit. The power receiving apparatus main body 301 includes power receiving apparatus main body side electrodes that are in contact with and electrically connected to the jacket side connector 35, and a load circuit electrically connected to the power receiving apparatus main body side electrodes. The control circuit 36 corresponds to the voltage step-down circuit in each of the embodiments described above. Hence, as a result of the jacket 302 housing the power receiving apparatus main body 301, this configuration realizes an electric operation similar to that of the power receiving apparatus shown in the second or third exemplary embodiments.

Note that terminal electrodes in contact with the electrodes of the power receiving apparatus main body 301 may be provided instead of the connector 35.

According to the fourth exemplary embodiment, various power receiving apparatuses may be adapted to be used with one type of power transmitting apparatus by preparing jackets corresponding to different types of apparatus. In addition, the power receiving apparatus main body 301 may be an apparatus that can be mounted alone on an existing contact charging stand. In other words, a power receiving apparatus main body using a contact charging method may be combined with a jacket so as to form a power receiving apparatus using a wireless charging method.

Figure 11A:
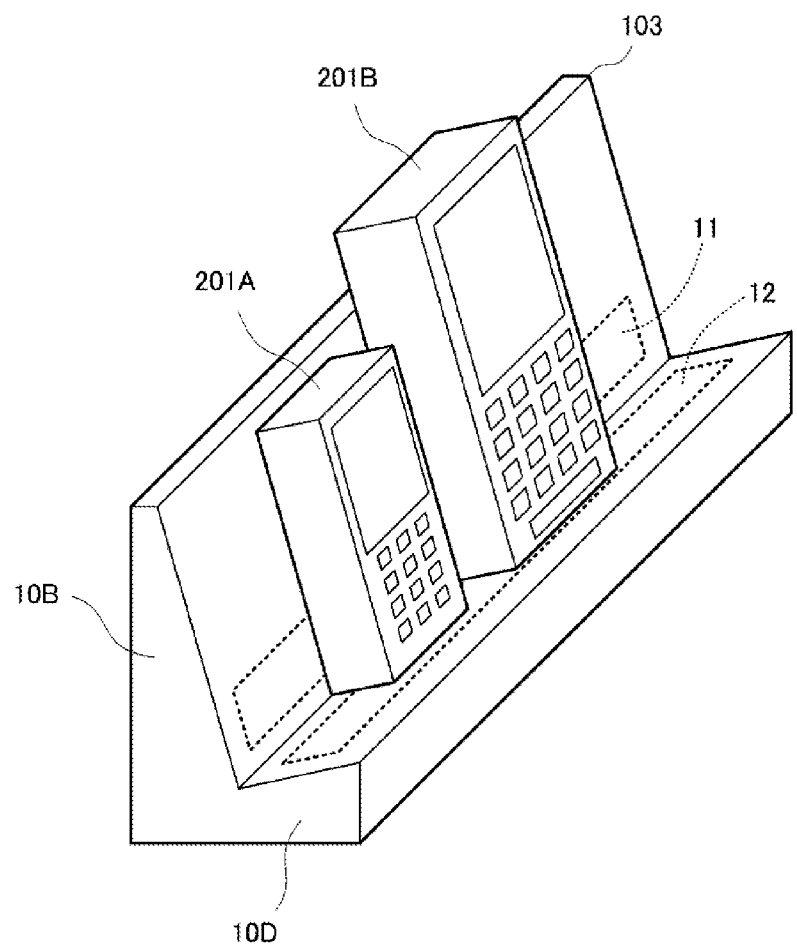
FIG. 11A is a perspective view of a wireless power transmission system, as a type of usage, according to a fifth exemplary embodiment.

FIG. 11A is a perspective view of a wireless power transmission system, as a type of usage, according to a fifth exemplary embodiment. In this example, a power transmitting apparatus 103 has a sufficiently large size to mount a plurality of power receiving apparatuses 201A and 201B. The power transmitting side passive electrode 11 and active electrode 12 are formed in such a manner as to extend in the direction of a valley formed by the seat 10D and the backrest 10B so as to allow a power receiving apparatus to be mounted anywhere on the seat 10D of the power transmitting apparatus 103.

In this manner, power can be transmitted from a single power transmitting apparatus to a plurality of power receiving apparatuses.

Figure 11B:
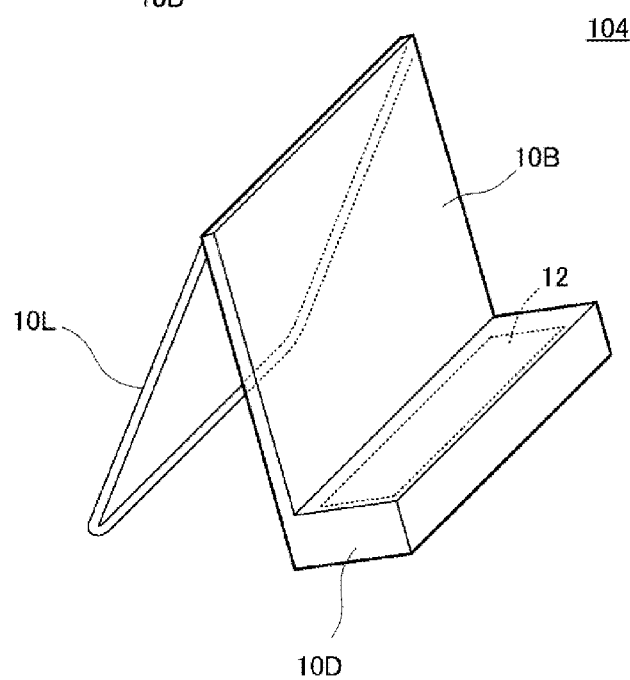
FIG. 11B is a perspective view of another wireless power transmitting apparatus according to the fifth exemplary embodiment.

FIG. 11B is a perspective view of another power transmitting apparatus 104 according to the fifth exemplary embodiment. The backrest 10B of the power transmitting apparatus 104 is made of a transparent substrate, and a transparent passive electrode is formed using, for example, ITO in the transparent substrate. In this example, the power transmitting apparatus 104 is used in such a manner as to stand on a table, for example, by opening a support member 10L backward behind the backrest 10B.

By using a transparent electrode in this manner, a power transmitting apparatus having a good design can be realized.

Figure 12A:
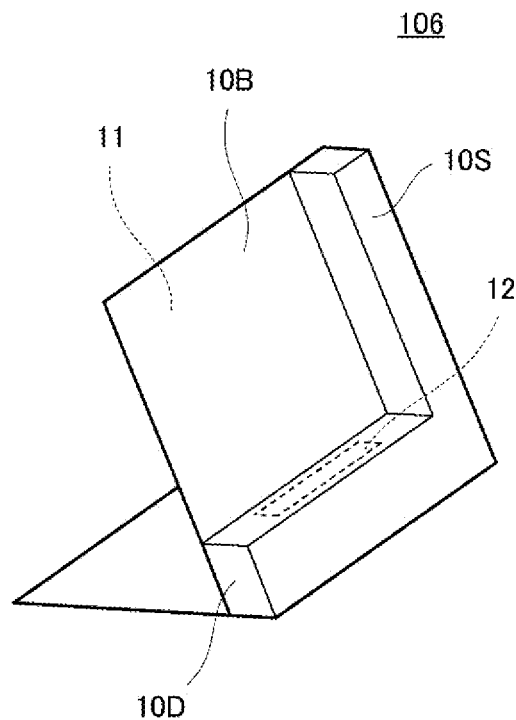
FIG. 12A is a perspective view of a power transmitting apparatus according to a sixth exemplary embodiment.
Figure 12B:
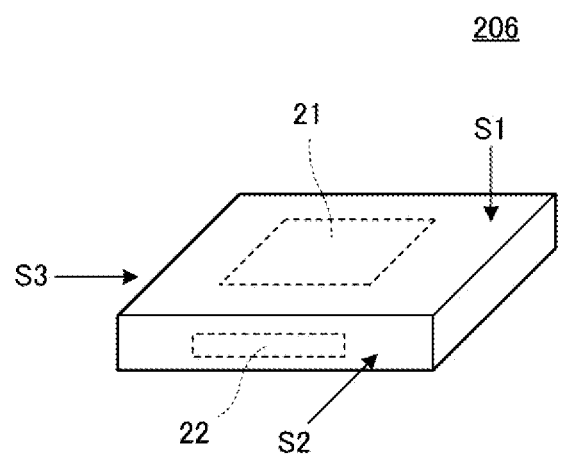
FIG. 12B is a perspective view of an exemplary power receiving apparatus which is mountable on the power transmitting apparatus shown in FIG. 12A.

FIG. 12A is a perspective view of a power transmitting apparatus 106 according to a sixth exemplary embodiment. FIG. 12B is a perspective view of a power receiving apparatus 206 which is mountable on the power transmitting apparatus 106. The power transmitting apparatus 106 and the power receiving apparatus 206 form a wireless power transmission system.

The power transmitting apparatus 106 includes the backrest 10B provided with the passive electrode 11, the seat 10D provided with the active electrode 12, and a side wall 10S. The respective inner surfaces of the backrest 10B, the seat 10D, and the side wall 10S are perpendicular to one another. The backrest 10B of the power transmitting apparatus 106 can be formed of a transparent substrate, and the passive electrode 11 made of, for example, ITO is formed in the substrate. A high-frequency voltage generator circuit is connected between the power transmitting apparatus side active electrode 12 and passive electrode 11.

The seat 10D corresponds to the "first flat portion" of the present embodiment; the backrest 10B corresponds to the "second flat portion" of the present embodiment; and the side wall 10S corresponds to a "third flat portion" of the present embodiment.

Referring to FIG. 12B, the casing of the power receiving apparatus 206 is substantially shaped like a rectangular parallelepiped, and the passive electrode 21 is provided along a first surface S1, having a large area, of the casing 20, and the active electrode 22 is provided along a second surface S2, which is one of the four surfaces (side surfaces) neighboring the first surface S1 among the six surfaces of the casing. A voltage step-down circuit is connected between the power receiving apparatus side active electrode 22 and passive electrode 21, and a load circuit is connected to the voltage step-down circuit.

Figure 13A:
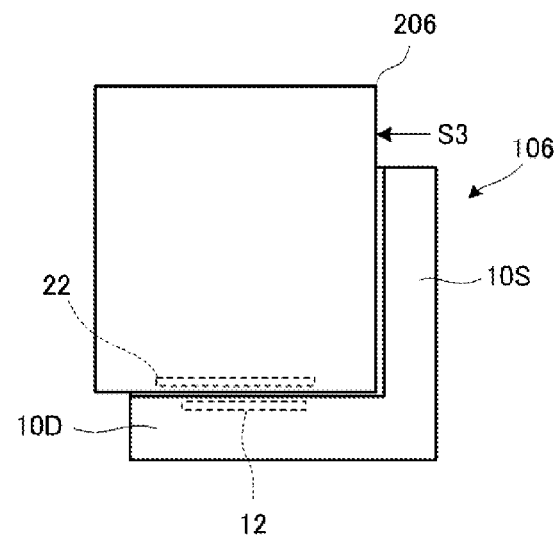
FIG. 13A is a front view illustrating a state in which the power receiving apparatus is normally mounted on the power transmitting apparatus in the sixth exemplary embodiment.

FIG. 13A is a front view illustrating a state in which the power receiving apparatus 206 is normally mounted on the power transmitting apparatus 106. The power receiving apparatus 206 is mounted on the mounting portion of the power transmitting apparatus 106 such that the second surface S2 of the power receiving apparatus 206 is placed on the seat 10D of the power transmitting apparatus 106 and a third surface S3 of the power receiving apparatus 206 is in contact with the side wall 10S. In this state, the passive electrode 11 of the power transmitting apparatus 106 faces the power receiving apparatus side passive electrode 21, and the active electrode 12 of the power transmitting apparatus 106 faces the power receiving apparatus side active electrode 22.

Figure 13B:
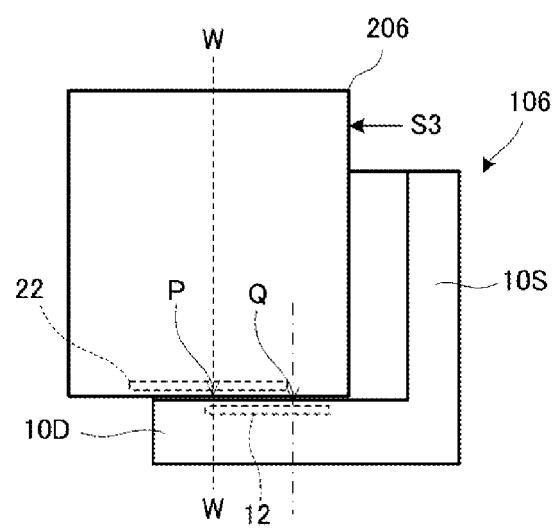
FIG. 13B illustrates a vertical line W-W passing through the center of gravity of the power receiving apparatus according to the sixth exemplary embodiment.
Figure 13C:
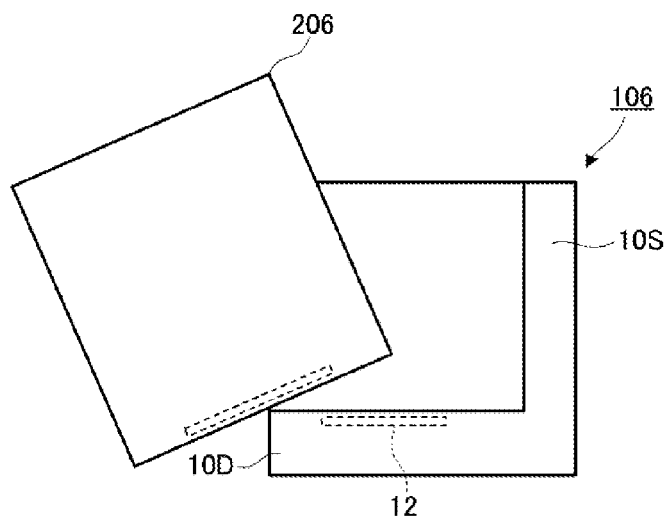
FIG. 13C illustrates how the power receiving apparatus falls from the seat of the power transmitting apparatus in the sixth exemplary embodiment.

Referring to FIG. 13B, a broken line W-W is a vertical line passing through the center of gravity of the power receiving apparatus 206. When the vertical line W-W passes beyond the edge of the seat 10D of the power transmitting apparatus 106, the power receiving apparatus 206 will fall from the seat 10D of the power transmitting apparatus 106, as illustrated in FIG. 13C. In other words, since a point P at which a line perpendicular to the seat 10D and passing through the center of gravity of the power receiving apparatus 206 intersects with the seat 10D is farther from the side wall 10S than the center Q of the seat 10D, the power receiving apparatus 206 is likely to fall from the seat 10D of the power transmitting apparatus 106 when the third surface S3 of the power receiving apparatus 206 is spaced apart from the side wall 10S. Hence, the operator intentionally or unintentionally mounts the power receiving apparatus 206 so as to make the third surface S3 of the power receiving apparatus 206 be in contact with the side wall 10S of the power transmitting apparatus 106.

Figure 14A:
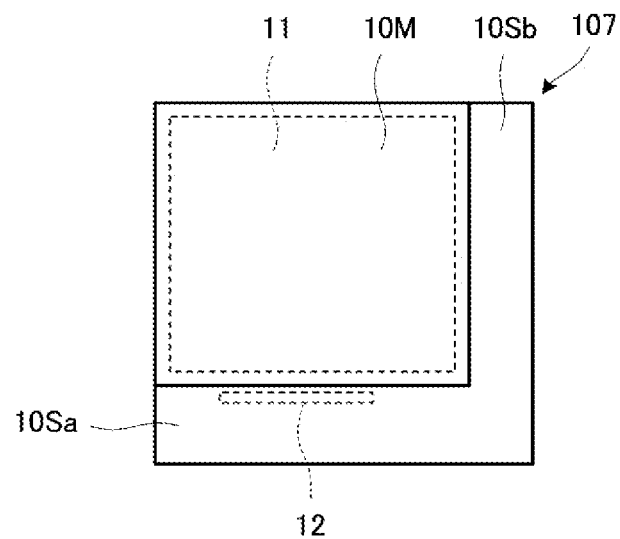
FIG. 14A is a plan view of a power transmitting apparatus according to a seventh exemplary embodiment.
Figure 14B:
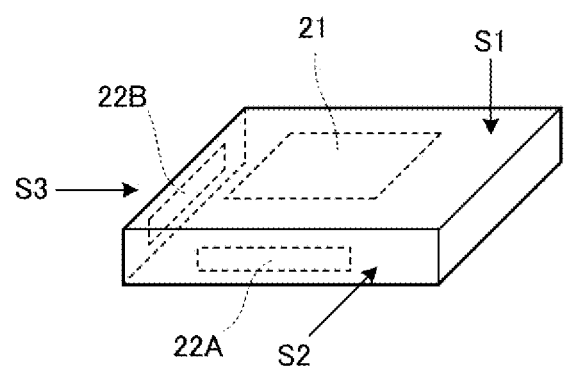
FIG. 14B is a perspective view of a power receiving apparatus according to the seventh exemplary embodiment.

FIG. 14A is a plan view (not a front view) of a power transmitting apparatus 107 according to a seventh exemplary embodiment. FIG. 14B is a perspective view of a power receiving apparatus 207 according to the seventh exemplary embodiment. The power transmitting apparatus 107 and the power receiving apparatus 207 form a wireless power transmission system.

The power transmitting apparatus 107 includes a mounting portion 10M provided with the passive electrode 11, a first sidewall 10Sa provided with the active electrode 12, and a second sidewall 10Sb. The upper surface of the mounting portion 10M and the respective inner surfaces of the first sidewall 10Sa and the second sidewall 10Sb are perpendicular to one another. A high-frequency voltage generator circuit is connected between the power transmitting apparatus side active electrode 12 and the power transmitting apparatus side passive electrode 11.

Referring to FIG. 14B, the casing of the power receiving apparatus 207 shown is substantially shaped like a rectangular parallelepiped, and the passive electrode 21 is provided along the first surface S1 having a large area, and active electrodes 22A and 22B are respectively provided along the second surface S2 and the third surface S3 adjacent to each other among the four surfaces (side surfaces) neighboring the first surface among the six surfaces of the casing. A voltage step-down circuit is connected between the passive electrode 21 and the active electrodes 22A and 22B, and a load circuit is connected to the voltage step-down circuit.

Figure 15A:
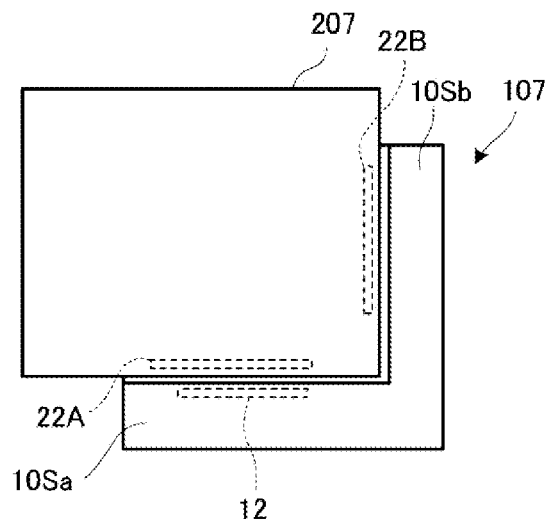
FIG. 15A is a front view illustrating a state in which the power receiving apparatus is normally mounted on the power transmitting apparatus in the seventh exemplary embodiment.

FIG. 15A is a front view illustrating a state in which the power receiving apparatus 207 is normally mounted on the power transmitting apparatus 107. The power receiving apparatus 207 is mounted on the mounting portion of the power transmitting apparatus 107 such that the first surface S1 of the power receiving apparatus 207 is placed on the mounting portion 10M of the power transmitting apparatus 107, the second surface S2 of the power receiving apparatus 207 is in contact with the first sidewall 10Sa of the power transmitting apparatus 107, and the third surface S3 of the power receiving apparatus 207 is in contact with the second sidewall 10Sb of the power transmitting apparatus 107. In this state, the passive electrode 11 of the power transmitting apparatus 107 faces the power receiving apparatus side passive electrode 21, and the active electrode 12 of the power transmitting apparatus 107 faces the power receiving apparatus side active electrode 22A.

The mounting portion 10M corresponds to the "second flat portion" of the present embodiment; the first sidewall 10Sa corresponds to the "first flat portion" of the present embodiment; and the second sidewall 10Sb corresponds to the "third flat portion" of the present embodiment.

Figure 15B:
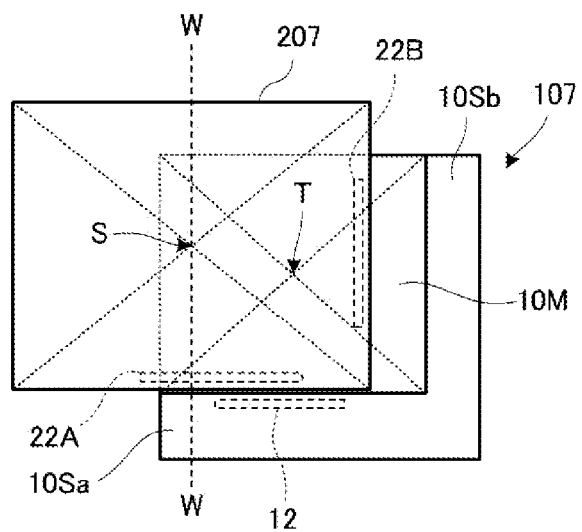
FIG. 15B illustrates a vertical line W-W which passes through the center of gravity of the power receiving apparatus and is parallel with an edge of the mounting portion of the power transmitting apparatus in the seventh exemplary embodiment.

Referring to FIG. 15B, a broken line W-W is a vertical line which passes through the center of gravity of the power receiving apparatus 207 and is parallel with an edge of the mounting portion 10M of the power transmitting apparatus 107. When the vertical line W-W passes beyond the edge of the seat 10M of the power transmitting apparatus 107, the power receiving apparatus 207 will fall from the seat 10M of the power transmitting apparatus 107. In other words, since a point S at which a line perpendicular to the seat 10M and passing through the center of gravity of the power receiving apparatus 207 intersects with the seat 10M is farther from the second side wall 10Sb than the center T of the seat 10M, the power receiving apparatus 207 is likely to fall from the seat 10M of the power transmitting apparatus 107 when the third surface S3 of the power receiving apparatus 207 is spaced apart from the second side wall 10Sb. Hence, the operator intentionally or unintentionally mounts the power receiving apparatus 207 so as to make the second surface S2 or the third surface S3 of the power receiving apparatus 207 be in contact with the second side wall 10Sb of the power transmitting apparatus 107.

The power receiving apparatus 207 may be mounted on the power transmitting apparatus 107 in such a manner as to be turned clockwise by 90 degrees from the state illustrated in FIG. 15A. In this case, the passive electrode 11 of the power transmitting apparatus 107 faces the power receiving apparatus side passive electrode 21, and the active electrode 12 of the power transmitting apparatus 107 faces the power receiving apparatus side active electrode 22B.

Figure 16A:
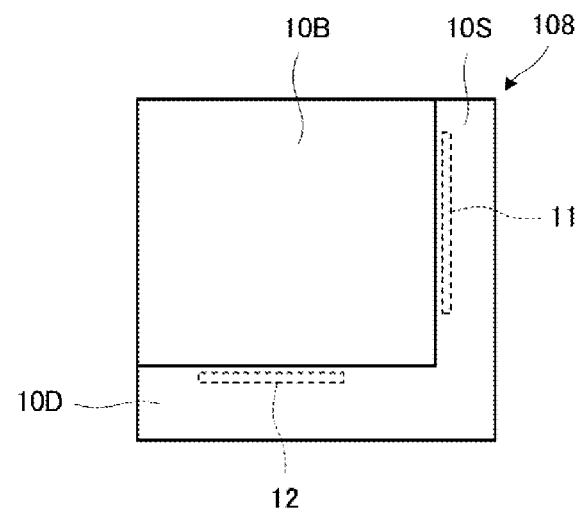
FIG. 16A is a front view of a power transmitting apparatus according to an eighth exemplary embodiment.
Figure 16B:
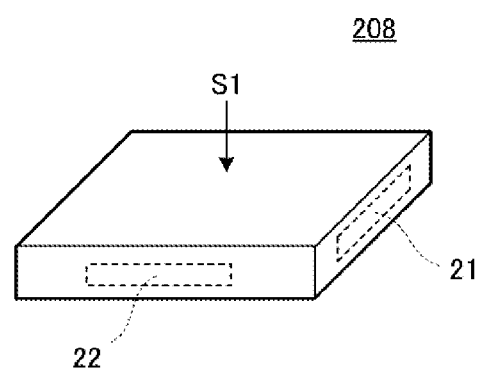
FIG. 16B is a perspective view of a power receiving apparatus according to the eighth exemplary embodiment.

FIG. 16A is a front view of a power transmitting apparatus 108 according to an eighth exemplary embodiment. FIG. 16B is a perspective view of a power receiving apparatus 208 according to the eighth exemplary embodiment. The power transmitting apparatus 108 and the power receiving apparatus 208 form a wireless power transmission system.

The power transmitting apparatus 108 includes the backrest 10B, the seat 10D provided with the active electrode 12, and the side wall 10S provided with the passive electrode 11. The respective inner surfaces of the backrest 10B, the seat 10D, and the side wall 10S are perpendicular to one another. A high-frequency voltage generator circuit is connected between the power transmitting apparatus side active electrode 12 and passive electrode 11.

The casing of the power receiving apparatus 208 is substantially shaped like a rectangular parallelepiped, and the active electrode 22 and the passive electrode 21 are respectively provided along surfaces adjacent to each other among the four surfaces (side surfaces) neighboring a surface having a larger area among the six surfaces of the casing. A voltage step-down circuit is connected between the active electrodes 22 and the passive electrode 21, and a load circuit is connected to the voltage step-down circuit.

The seat 10D corresponds to the "first flat portion" of the present embodiment; the backrest 10B corresponds to the "second flat portion" of the present embodiment; and the side wall 10S corresponds to the "third flat portion" of the present embodiment. In the eighth exemplary embodiment, without providing the passive electrode along the first surface S1 of the power receiving apparatus 208, the passive electrode 21 can be provided along a surface adjacent to the first surface S1. In this case, power is transmitted only when a surface provided with the passive electrode 21 of the power receiving apparatus 208 is in contact with the third flat portion of the power transmitting apparatus 108, whereby safety is increased. In addition, the shape of the passive electrode of the power receiving apparatus 208 can be made to be small and slim, but a variation in the potential of the passive electrode is large.

Note that the passive electrode 21 may also be provided along the large-area surface of the power receiving apparatus 208, and the backrest 10B of the power transmitting apparatus 108 may also be provided with a passive electrode. In this case, capacitance generated between the respective passive electrodes of the power transmitting apparatus 108 and the power receiving apparatus 208 can be made to be larger than the case in which the passive electrode is provided only on the first surface S1 of the power receiving apparatus 208, and the potential of the passive electrodes can be made to be lower.

Figure 17:
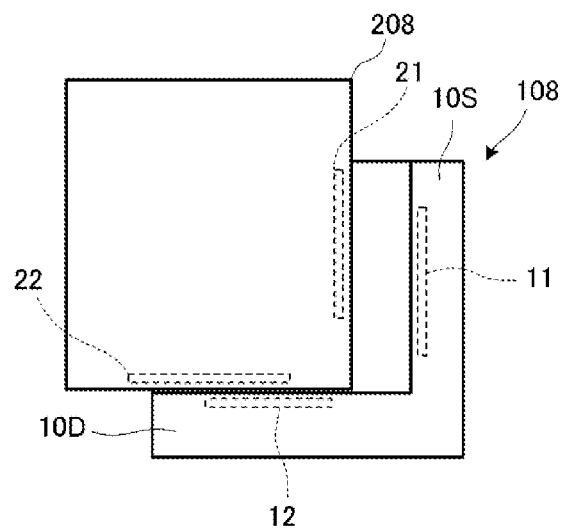
FIG. 17 is a front view illustrating a state in which the power receiving apparatus is mounted on the power transmitting apparatus in the eighth exemplary embodiment.

FIG. 17 is a front view illustrating a state in which the power receiving apparatus 208 is mounted on the power transmitting apparatus 108. In a state in which the power receiving apparatus 208 is mounted on the seat of the power transmitting apparatus 108, the passive electrode 11 of the power transmitting apparatus 108 faces the passive electrode 21 of the power receiving apparatus 208, and the active electrode 12 of the power transmitting apparatus 108 faces the active electrode 22 of the power receiving apparatus 208.

In a ninth exemplary embodiment, a power transmitting apparatus is provided with a plurality of active electrodes, and the active electrodes are made to be effective in accordance with an orientation in which a power receiving apparatus is mounted on the power transmitting apparatus.

Figure 18A:
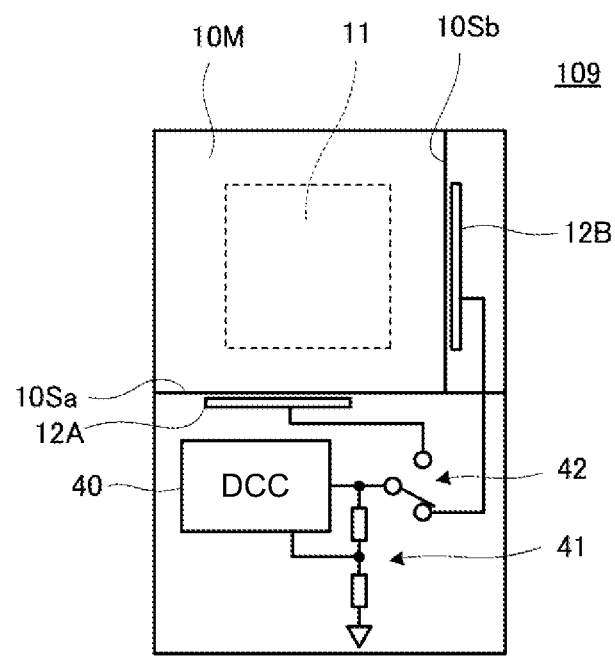
FIG. 18A is a plan view of a power transmitting apparatus according to a ninth exemplary embodiment.
Figure 18B:
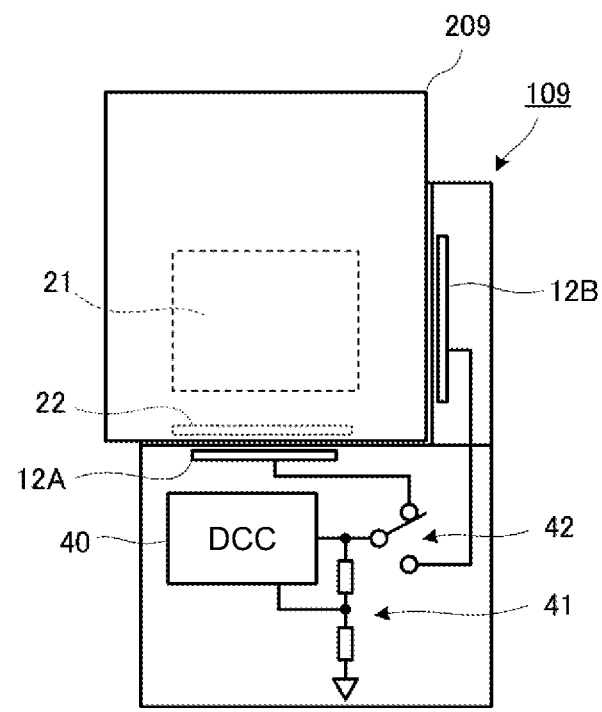
FIG. 18B is a plan view illustrating a state in which a power receiving apparatus according to the ninth exemplary embodiment is mounted on the power transmitting apparatus.

FIG. 18A is a plan view of a power transmitting apparatus 109, and FIG. 18B is a plan view illustrating a state in which a power receiving apparatus 209 is mounted on the power transmitting apparatus 109. The power transmitting apparatus 109 includes the mounting portion 10M provided with the passive electrode 11, the first sidewall 10Sa provided with an active electrode 12A, and the second sidewall 10Sb provided with an active electrode 12B. The upper surface of the mounting portion 10M and the inner surfaces of the first sidewall 10Sa and the second sidewall 10Sb are perpendicular to one another. A high-frequency voltage generator circuit is connected between the power transmitting apparatus side active electrode 12 and passive electrode 11.

The mounting portion 10M corresponds to the "second flat portion" of the present embodiment; the first sidewall 10Sa corresponds to the "first flat portion" of the present embodiment; and the second sidewall 10Sb corresponds to the "third flat portion" of the present embodiment.

Referring to FIG. 18B, the casing of the power receiving apparatus 209 is substantially shaped like a rectangular parallelepiped. The passive electrode 21 is provided along a surface having a large area, and one side surface among the six surfaces of the casing is provided with the active electrode 22. A voltage step-down circuit is connected between the active electrodes 22 and the passive electrode 21, and a load circuit is connected to the voltage step-down circuit.

The power transmitting apparatus 109 includes a voltage detecting circuit 41 that detects a voltage applied to the active electrodes 12A and 12B, a transfer switch 42 that selects, among the active electrodes 12A and 12B, one to which a voltage is to be applied, a driving control circuit (DCC) 40, and the like. The driving control circuit 40, by detecting which of the active electrodes 12A and 12B is facing the active electrode of the power receiving apparatus on the basis of the voltage detected by the voltage detecting circuit 41 of the driving control circuit 40, selectively switches the transfer switch 42 so as to apply a high-frequency voltage to the corresponding active electrode. In the state illustrated in FIG. 18B, the transfer switch 42 is switched so as to select the active electrode 12A.

FIG. 19 is a block diagram of the power transmitting apparatus 109. As shown in FIG. 19, a driving power supply circuit 51 is a power supply circuit which receives power from a commercial power source and generates a fixed DC voltage (for example, DC 5V). A control circuit 52 controls the units described below through input and output of signals from and to the units.

A driving control circuit (DCC) 55 controls switching of the switching device of a switching circuit 56 in accordance with an ON/OFF signal output from the control circuit 52. The switching circuit 56 alternately drives the input of a voltage step-up circuit 37.

A DCI detecting circuit 53 detects a driving current (i.e., amount of current supplied from the driving power supply circuit 51 to the voltage step-up circuit 37) flowing through the switching circuit 56. The control circuit 52 reads this detection signal V (DCI). An ACV detecting circuit 58 divides a voltage applied to the active electrode 12A or the active electrode 12B using capacitance, and generates a detection signal V (ACV), which is a DC voltage obtained by rectifying the divided AC voltage. The control circuit 52 reads this detection signal V (ACV).

Figure 20:
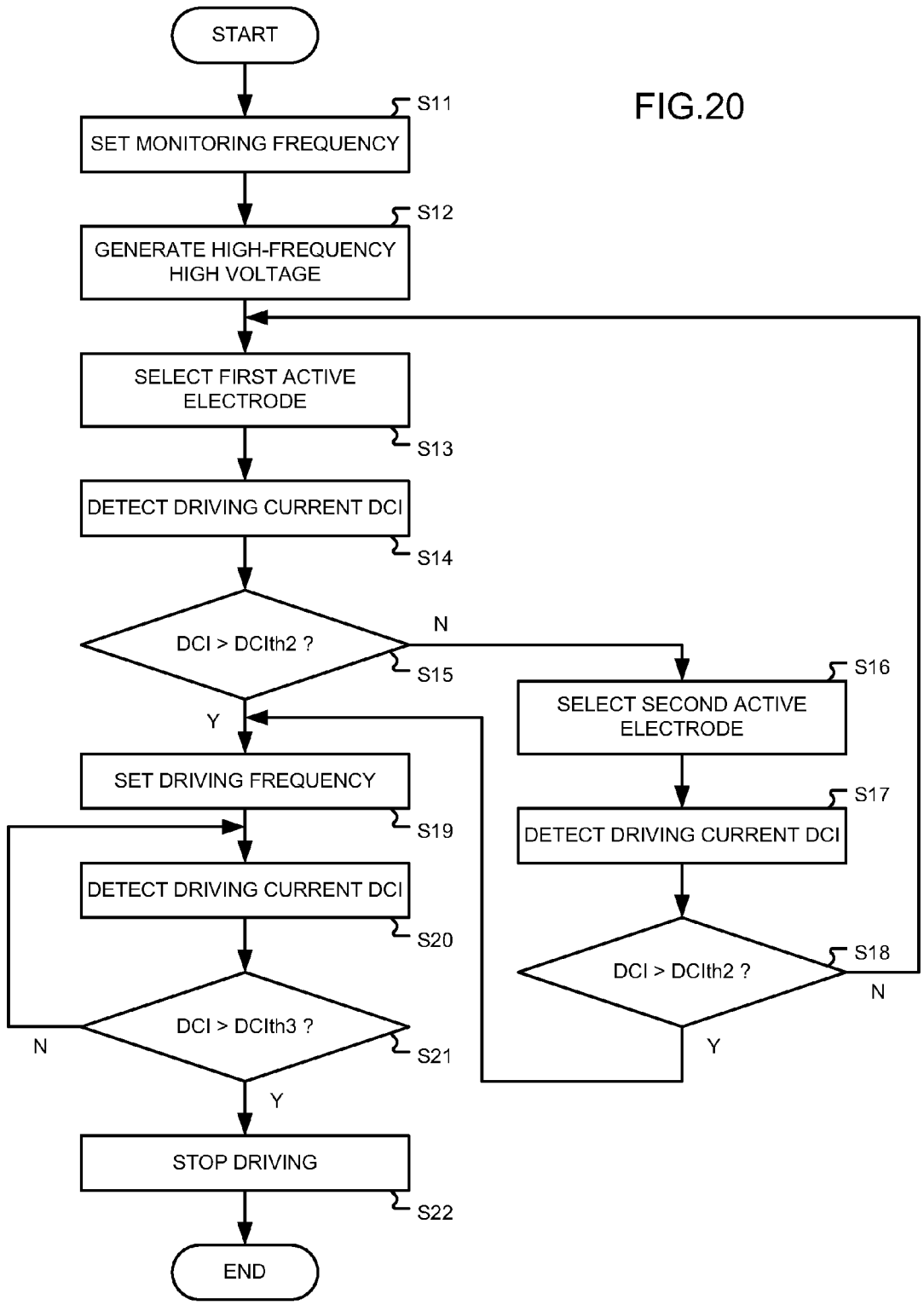
FIG. 20 is a flowchart illustrating processing steps for detecting mounting of a power receiving apparatus on a power transmitting apparatus and subsequent processing steps, among processing steps performed by the control circuit illustrated in FIG. 19.

FIG. 20 is a flowchart illustrating processing steps for detecting mounting of a power receiving apparatus on a power transmitting apparatus and subsequent processing steps, among processing steps performed by the control circuit 52 illustrated in FIG. 19.

First, a high-frequency voltage having a monitoring frequency is generated (S11→S12). Then the transfer switch 42 is made to select the active electrode 12A and the driving current DCI is detected (S13→S14). When the driving current DCI does not exceed a threshold DCIth2, the transfer switch 42 is made to select the active electrode 12B, and the driving current DCI is detected (S16→S17→S18).

The threshold DCIth2 is a value for detecting that a power receiving apparatus which is to receive power has been mounted. Even when any metal object is mounted, by generating the high-frequency voltage having a monitoring frequency, no resonance occurs and hence almost no capacitance coupling occurs, resulting in no power transmission. Hence, safety is maintained.

When the driving current DCI exceeds the threshold DCIth2, a high-frequency voltage having a driving frequency is generated and the driving current DCI is detected (S19→S20). Then, the control circuit 52 waits until the driving current DCI becomes below a threshold DCIth3 (S21→S20). The threshold DCIth3 is a value for detecting the driving current corresponding to time to stop power transmission. For example, the driving current DCI becomes below the threshold DCIth3 when the secondary battery included in the load circuit has entered a fully charged state or when the power receiving apparatus has been removed. When the driving current DCI has become below the threshold DCIth3, driving is stopped (S22).

In this manner, the power transmitting apparatus 109 is provided with the two active electrodes 12A and 12B, and one of the active electrodes 12A and 12B of the power transmitting apparatus 109 is selected in accordance with the orientation of the power receiving apparatus 209 mounted on the power transmitting apparatus 109.

According to disclosed embodiments in which the power receiving apparatus side active electrode and the power receiving apparatus side passive electrode are not parallel with each other in terms of a positional relationship, because the active electrode and passive electrode of the power transmitting apparatus are not parallel, and the active electrode and passive electrode of the power receiving apparatus are not parallel with each other, stray capacitance can be suppressed and a decrease in the degree of coupling can be made small, whereby high transmission efficiency can be obtained. Further, since the active electrodes can be arranged in such a manner as not to be parallel with a printed wire board within the apparatus, influence on the electric characteristics of various circuits within the apparatus and the battery characteristics of a secondary battery can be suppressed.

Additionally, in embodiments with the power receiving apparatus side passive electrode provided along a first surface which has a relatively larger area among six surfaces of a casing of the power receiving apparatus, and a second surface that is one of four surfaces neighboring the first surface among the six surfaces of the casing of the power receiving apparatus is provided with the power receiving apparatus side active electrode, it can be easy to design a power transmitting apparatus in which an active electrode is arranged at a position corresponding to the active electrode of a power receiving apparatus, and to arrange a passive electrode at a position corresponding to the passive electrode of the power receiving apparatus.

In embodiments in which the power receiving apparatus side passive electrode or active electrode is provided, for example, along a first surface among six surfaces of a casing of the power receiving apparatus, and each of a plurality of surfaces among second to fifth surfaces neighboring the first surface among the six surfaces is provided with the power receiving apparatus side active electrode or passive electrode, the degree of freedom of orientation with which the power receiving apparatus is mounted on the power transmitting apparatus may be increased.

Additionally, in embodiments in which the power receiving apparatus further includes a detecting unit that detects an electrode facing the power transmitting apparatus side active electrode among electrodes arranged along second to fifth surfaces neighboring the first surface among six surfaces of a casing of the power receiving apparatus, and a switching unit that connects the electrode facing the power transmitting apparatus side active electrode to the voltage step-down circuit, since only a necessary active electrode is used among the plurality of active electrodes of the power receiving apparatus, a potential is not unnecessarily applied to the remaining unnecessary active electrodes.

In embodiments including a jacket that surrounds the power receiving apparatus main body, various power receiving apparatuses may be adapted to one type of power transmitting apparatus by preparing jackets corresponding to different types of apparatus. In addition, since it is only required that the power receiving apparatus main body support a contact power receiving method, the power receiving apparatus main body can receive power by itself using a contact method.

In embodiments in which the power transmitting apparatus includes a first flat portion provided with the power transmitting apparatus side active electrode, and a second flat portion that provided with the power transmitting apparatus side passive electrode and that is perpendicular to the first flat portion, alignment of the power transmitting apparatus side active electrode and the power receiving apparatus side active electrode with respect each other and alignment of the power transmitting apparatus side passive electrode and the power receiving apparatus side passive electrode with respect to each other can be performed only by mounting a power receiving apparatus in which two surfaces of a hexahedron adjacent to each other are respectively provided with an active electrode and a passive electrode.

In embodiments in which the power transmitting apparatus includes a third flat portion perpendicular to the first flat portion and the second flat portion, and the power transmitting apparatus side active electrode faces the power receiving apparatus side active electrode in a state in which one surface of a casing of the power receiving apparatus is in contact with the third flat portion, alignment of the power receiving apparatus with respect to the power transmitting apparatus can be easily and reliably performed by making three surfaces of the power receiving apparatus adjacent to one another be respectively in contact with the first flat portion, the second flat portion, and the third flat portion.

In embodiments in which the third flat portion is provided with the power transmitting apparatus side passive electrode, since the first surface of the casing of the power receiving apparatus is not provided with the passive electrode, and a surface (surface adjacent to a surface provided with the active electrode among the four surfaces neighboring the first surface of the power receiving apparatus) of the casing of the power receiving apparatus facing the power transmitting apparatus side passive electrode is provided with the passive electrode, power is transmitted only when the surface provided with the passive electrode of the power receiving apparatus is in contact with the third flat portion of the power transmitting apparatus, whereby safety can be increased. Further, according to this configuration, since a passive electrode may be provided also along a large area surface of the power receiving apparatus, and the second flat portion of the power transmitting apparatus may also be provided with a passive electrode, capacitance generated between the respective passive electrodes of the power transmitting apparatus and the power receiving apparatus can be made to be larger, and the potential of the passive electrodes can be made to be lower.

In embodiment having a third flat portion provided with a third flat portion side power transmitting apparatus side active electrode separated from the power transmitting apparatus side electrode provided in the first flat portion, and the power transmitting apparatus further including a detecting unit that detects which of the power transmitting apparatus side active electrode in the first flat portion and the power transmitting apparatus side active electrode in the third flat portion is an electrode facing the active electrode of the power receiving apparatus, and a switching unit that connects the electrode facing the active electrode of the power receiving apparatus to the high-frequency voltage generator circuit, even in the case in which only one surface of the power receiving apparatus is provided with an active electrode, the power receiving apparatus can be used whether it is vertically oriented or horizontally oriented with respect to the power transmitting apparatus. Further, since only a necessary active electrode is used among the plurality of active electrodes of the power transmitting apparatus, a potential is not unnecessarily applied to the remaining unnecessary active electrodes.

Additionally, embodiments in which the power transmitting apparatus includes a first flat portion provided with the power transmitting apparatus side active electrode, a second flat portion provided with the power transmitting apparatus side passive electrode and that is perpendicular to the first flat portion, and a third flat portion perpendicular to the first flat portion and the second flat portion, and where the power transmitting apparatus side active electrode faces the power receiving apparatus side active electrode in a state in which one surface of a casing of the power receiving apparatus is in contact with the third flat portion, and a point at which a line that is perpendicular to the first flat portion or the second flat portion and that passes through a center of gravity of the power receiving apparatus intersects with the first flat portion or the second flat portion is farther from the third flat portion than a center of the first flat portion or the second flat portion, when the power receiving apparatus is mounted on the power transmitting apparatus, the power receiving apparatus is prevented from falling from the seat or mounting portion of the power transmitting apparatus, and the power receiving apparatus is reliably mounted at a correct position.

According to disclosed embodiments, stray capacitance not contributing to power transmission can be decreased and the power transmission efficiency can be increased in a power transmitting apparatus, a power receiving apparatus, and a wireless power transmission system without causing increases in the sizes of the apparatuses.

While preferred embodiments have been described above, it is to be understood that variations and modifications will be apparent to those skilled in the art without departing from the scope and spirit of the disclosure. The scope of the invention, therefore, is to be determined solely by the following claims and their equivalents.

What is claimed is:

1. A power receiving apparatus forming a pair with a power transmitting apparatus in which a high-frequency voltage generator circuit that applies a high-frequency high voltage is connected between a power transmitting apparatus side active electrode and a power transmitting apparatus side passive electrode, the power receiving apparatus comprising:
    a power receiving apparatus side active electrode that faces the power transmitting apparatus side active electrode with the power receiving apparatus mounted to the power transmitting apparatus;
    a power receiving apparatus side passive electrode that faces the power transmitting apparatus side passive electrode with the power receiving apparatus mounted to the power transmitting apparatus;
    a voltage step-down circuit that decreases a voltage generated between the power receiving apparatus side active electrode and the power receiving apparatus side passive electrode; and
    a load circuit that receives an output voltage of the voltage step-down circuit as a power supply voltage,
    wherein the power receiving apparatus side active electrode and the power receiving apparatus side passive electrode are not parallel with each other in terms of a positional relationship.

2. The power receiving apparatus according to claim 1, wherein the power receiving apparatus further includes a casing which is a solid figure having six surfaces.

3. The power receiving apparatus according to claim 1, wherein the power receiving apparatus side active electrode and the power receiving apparatus side passive electrode are substantially perpendicular to each other.

4. The power receiving apparatus according to claim 2,
    wherein the power receiving apparatus side passive electrode is provided along a first surface which has a relatively larger area among six surfaces of the casing of the power receiving apparatus, and
    wherein a second surface, which is one of four surfaces neighboring the first surface among the six surfaces of the casing of the power receiving apparatus, is provided with the power receiving apparatus side active electrode.

5. The power receiving apparatus according to claim 2,
    wherein one of the power receiving apparatus side passive electrode and active electrode is provided along a first surface among six surfaces of the casing of the power receiving apparatus, and
    wherein each of a plurality of surfaces among second to fifth surfaces neighboring the first surface among the six surfaces is provided with the other of the power receiving apparatus side active electrode and passive electrode.

6. The power receiving apparatus according to claim 2, further comprising:
    a detecting unit that detects an electrode facing the power transmitting apparatus side active electrode among electrodes provided along plural surfaces of the six surfaces of the casing of the power receiving apparatus; and
    a switching unit that connects the electrode facing the power transmitting apparatus side active electrode to the voltage step-down circuit.

7. The power receiving apparatus according to claim 1,
    wherein the power receiving apparatus is formed of a power receiving apparatus main body and a jacket that surrounds the power receiving apparatus main body,
    wherein the jacket includes at least:
        the power receiving apparatus side active electrode;
        the power receiving apparatus side passive electrode;
        the voltage step-down circuit; and
        a jacket side electrode that supplies an output voltage of the voltage step-down circuit, and wherein the power receiving apparatus main body includes:
a power receiving apparatus main body side electrode that is in contact with and electrically connected to the jacket side electrode; and
electrical connection between the load circuit and the power receiving apparatus main body side electrode.

8. A power transmitting apparatus forming a pair with a power receiving apparatus in which a voltage step-down circuit is connected between a power receiving apparatus side active electrode and a power receiving apparatus side passive electrode, the power transmitting apparatus comprising:
a power transmitting apparatus side active electrode that faces the power receiving apparatus side active electrode with the power receiving apparatus mounted to the power transmitting apparatus;
a power transmitting apparatus side passive electrode that faces the power receiving apparatus side passive electrode with the power receiving apparatus mounted to the power transmitting apparatus; and
a high-frequency voltage generator circuit connected between the power transmitting apparatus side active electrode and the power transmitting apparatus side passive electrode,
wherein the power transmitting apparatus side active electrode and the power transmitting apparatus side passive electrode are not parallel with each other in terms of a positional relationship.

9. The power transmitting apparatus according to claim 8, further comprising:
a first flat portion provided with the power transmitting apparatus side active electrode; and
a second flat portion that is provided with the power transmitting apparatus side passive electrode and that is perpendicular to the first flat portion.

10. The power transmitting apparatus according to claim 9, further comprising:
a third flat portion perpendicular to the first flat portion and the second flat portion,
wherein the power transmitting apparatus side active electrode faces the power receiving apparatus side active electrode in a state in which one surface of the power receiving apparatus is in contact with the third flat portion.

11. The power transmitting apparatus according to claim 10, wherein the third flat portion is provided with the power transmitting apparatus side passive electrode.

12. The power transmitting apparatus according to claim 10, wherein the third flat portion is provided with a third flat portion side power transmitting apparatus side active electrode separated from the power transmitting apparatus side electrode provided in the first flat portion, the power transmitting apparatus further comprising:
a detecting unit that detects which of the power transmitting apparatus side active electrode in the first flat portion and the power transmitting apparatus side active electrode in the third flat portion is an electrode facing the active electrode of the power receiving apparatus; and
a switching unit that connects the detected electrode facing the active electrode of the power receiving apparatus to the high-frequency voltage generator circuit.

13. A wireless power transmission system comprising:
a power transmitting apparatus in which a high-frequency voltage generator circuit that applies a high-frequency high voltage is connected between a power transmitting apparatus side active electrode and a power transmitting apparatus side passive electrode; and
a power receiving apparatus in which a voltage step-down circuit is connected between a power receiving apparatus side active electrode and a power receiving apparatus side passive electrode, and which includes a load circuit that receives an output voltage of the voltage step-down circuit as a power supply voltage,
wherein the power transmitting apparatus side active electrode is not parallel with the power transmitting apparatus side passive electrode, and the power receiving apparatus side active electrode is not parallel with the power receiving apparatus side passive electrode.

14. The wireless power transmission system according to claim 13,
wherein the power transmitting apparatus includes:
a first flat portion provided with the power transmitting apparatus side active electrode;
a second flat portion that is provided with the power transmitting apparatus side passive electrode and that is perpendicular to the first flat portion; and
a third flat portion perpendicular to the first flat portion and the second flat portion,
wherein the power transmitting apparatus side active electrode faces the power receiving apparatus side active electrode in a state in which one surface of the power receiving apparatus is in contact with the third flat portion, and
wherein a point at which a line that is perpendicular to the first flat portion or the second flat portion and that passes through a center of gravity of the power receiving apparatus intersects with the first flat portion or the second flat portion is farther from the third flat portion than a center of the first flat portion or the second flat portion.

* * * * *